United States Patent
Furuta

(10) Patent No.: US 10,432,881 B2
(45) Date of Patent: Oct. 1, 2019

(54) INFRARED IMAGING DEVICE AND METHOD OF UPDATING FIXED PATTERN NOISE DATA

(71) Applicant: FUJIFILM Corporation, Tokyo (JP)

(72) Inventor: Yoshinori Furuta, Saitama (JP)

(73) Assignee: FUJIFILM Corporation, Tokyo (JP)

(*) Notice: Subject to any disclaimer, the term of this patent is extended or adjusted under 35 U.S.C. 154(b) by 48 days.

(21) Appl. No.: 15/814,895

(22) Filed: Nov. 16, 2017

(65) Prior Publication Data

US 2018/0098009 A1    Apr. 5, 2018

Related U.S. Application Data

(63) Continuation of application No. PCT/JP2016/002355, filed on May 13, 2016.

(30) Foreign Application Priority Data

May 21, 2015 (JP) ................................ 2015-103567

(51) Int. Cl.
*H04N 5/365* (2011.01)
*G01J 1/44* (2006.01)
(Continued)

(52) U.S. Cl.
CPC ............ *H04N 5/365* (2013.01); *G01J 1/0411* (2013.01); *G01J 1/12* (2013.01); *G01J 1/42* (2013.01);
(Continued)

(58) Field of Classification Search
CPC ........ H04N 5/365; H04N 5/33; H04N 5/3651; G01J 1/42
See application file for complete search history.

(56) References Cited

U.S. PATENT DOCUMENTS

2005/0157942 A1    7/2005 Chen et al.
2006/0038109 A1    2/2006 Kinney et al.
(Continued)

FOREIGN PATENT DOCUMENTS

JP    10-142065 A    5/1998
JP    2001-336983 A    12/2001
(Continued)

OTHER PUBLICATIONS

International Preliminary Report on Patentability and Written Opinion of the International Searching Authority (Forms PCT/IB/373, PCT/IB/326 and PCT/ISA/237), dated Nov. 30, 2017, for International Application No. PCT/JP2016/002355, with an English translation of the Written Opinion.
(Continued)

*Primary Examiner* — Anand S Rao
*Assistant Examiner* — Tyler B Edwards
(74) *Attorney, Agent, or Firm* — Birch, Stewart, Kolasch & Birch, LLP

(57) ABSTRACT

A signal component amount calculation unit calculates dispersion or standard deviation of multiple times of infrared detection signals detected by each detector element to be processed, and calculates the amount of a signal component dependent on infrared rays incident on the infrared detector included in the infrared detection signals, on the basis of the calculated dispersion or standard deviation. A fixed pattern noise calculation unit calculates the amount of a fixed pattern noise component on the basis of the infrared detection signals and the calculated amount of a signal component. A data update unit updates the fixed pattern noise data with the calculated amount of a fixed pattern noise component.

10 Claims, 7 Drawing Sheets

(51) Int. Cl.
*G01J 1/42* (2006.01)
*G01J 1/04* (2006.01)
*H04N 5/33* (2006.01)
*H04N 5/232* (2006.01)
*G01J 1/12* (2006.01)
G01J 5/00 (2006.01)
G01J 5/06 (2006.01)

(52) U.S. Cl.
CPC .............. *G01J 1/4228* (2013.01); *G01J 1/44* (2013.01); *H04N 5/23212* (2013.01); *H04N 5/33* (2013.01); *H04N 5/3651* (2013.01); *H04N 5/3656* (2013.01); *G01J 2001/444* (2013.01); *G01J 2005/0048* (2013.01); *G01J 2005/0077* (2013.01); *G01J 2005/068* (2013.01)

(56) References Cited

U.S. PATENT DOCUMENTS

| | | |
|---|---|---|
| 2009/0304156 A1 | 12/2009 | Yamada |
| 2012/0075506 A1 | 3/2012 | van Beek |
| 2012/0091340 A1* | 4/2012 | Young ..................... H04N 5/33 250/332 |
| 2014/0037225 A1* | 2/2014 | Hogasten .................. G06T 5/50 382/260 |

FOREIGN PATENT DOCUMENTS

| | | |
|---|---|---|
| JP | 2002-310804 A | 10/2002 |
| JP | 2004-241818 A | 8/2004 |
| JP | 2009-297078 A | 12/2009 |
| JP | 2012-235442 A | 12/2009 |
| JP | 2013-207788 A | 10/2013 |

OTHER PUBLICATIONS

International Search Report and English translation (Form PCT/ISA/210), dated Sep. 20, 2016, for International Application No. PCT/JP2016/002355.

Chinese Office Action and Search Report, dated Mar. 25, 2019, for Chinese Application No. 201680028637.9, with an English machine translation of the Chinese Office Action.

* cited by examiner

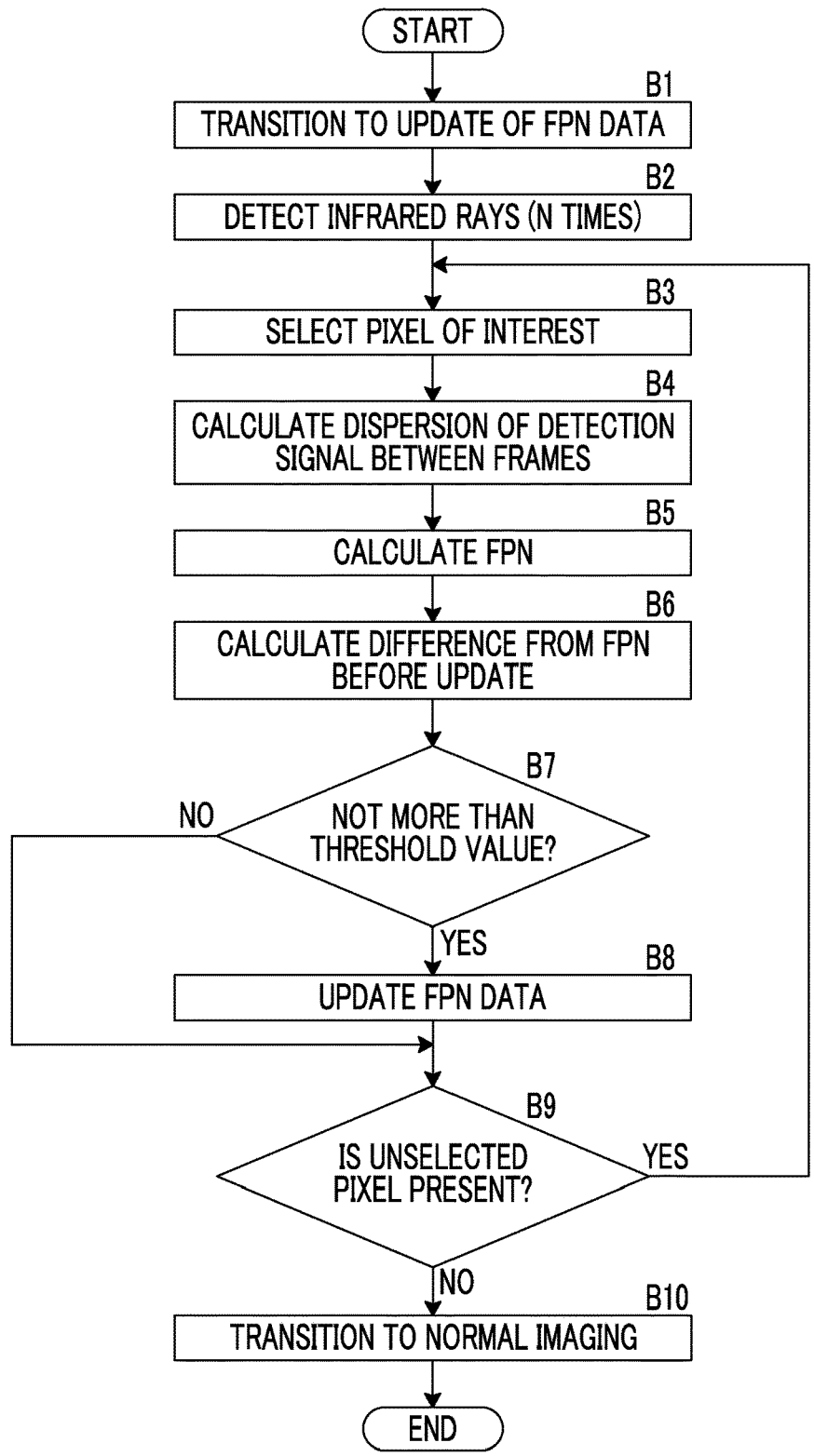

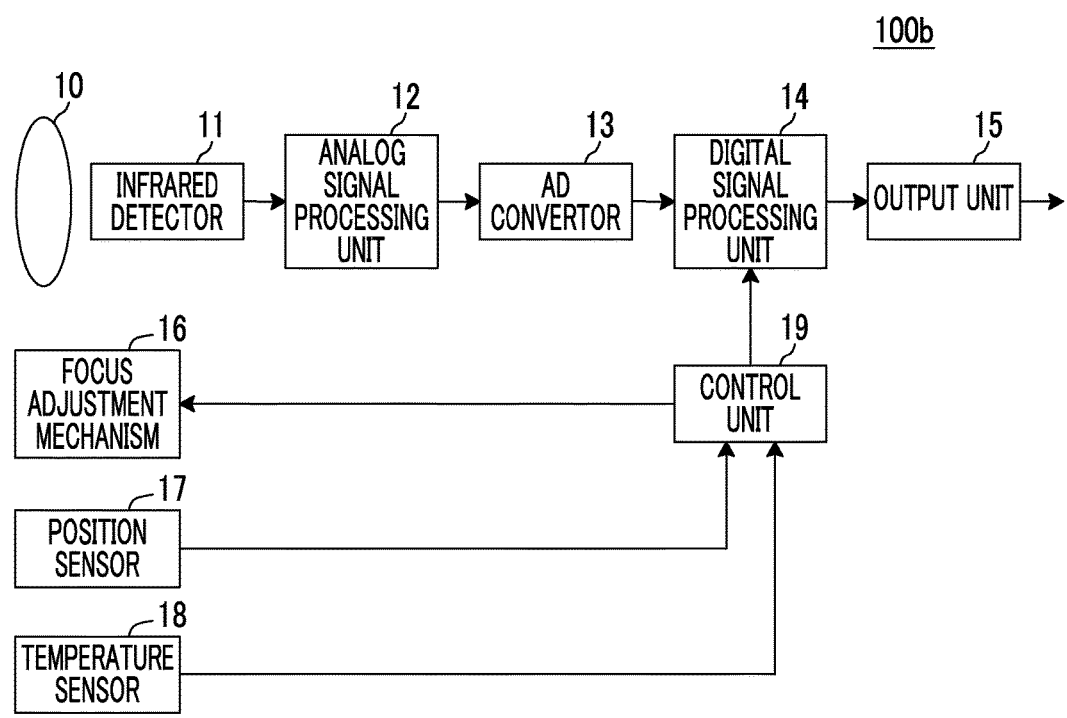

INFRARED IMAGING DEVICE AND METHOD OF UPDATING FIXED PATTERN NOISE DATA

CROSS REFERENCE TO RELATED APPLICATIONS

The present application is a Continuation of PCT International Application No. PCT/JP2016/002355 filed on May 13, 2016, which claims priority under 35 U.S.C. § 119(a) to Japanese Patent Application No. 2015-103567 filed on May 21, 2015. Each of the above applications is hereby expressly incorporated by reference, in its entirety, into the present application.

BACKGROUND

Technical Field

The present invention relates to an infrared imaging device, and more specifically relates to an infrared imaging device including an infrared detector that detects incident infrared rays and converts the detected incident infrared rays into an electrical signal. In addition, the present invention relates to a method of updating fixed pattern noise data in such an infrared imaging device.

Background Art

Infrared imaging devices that detect incident infrared light (infrared rays) and generate an infrared image have been known. Generally, the infrared imaging devices include an infrared detector that detects infrared rays radiated from a subject and converts the detected infrared rays into an electrical signal. The infrared imaging devices are used in a wide range of fields such as a monitoring camera, a night vision device, thermography, and a front monitoring device mounted in a vehicle, an airplane or the like.

The infrared imaging device generates fixed pattern noise specific to the device such as a variation in the sensitivity of the infrared detector, or variations in the gain and offset of a circuit. Particularly, in the infrared imaging device using a focal plane array arranged two-dimensionally as infrared detector elements, each detector element within the array has a fluctuation in characteristics. Therefore, as a result, fixed pattern noise changing for a relatively long time is generated.

The generation of the fixed pattern noise causes the occurrence of a fluctuation in a pixel value and leads to a uniform image not being obtained even in a case where an image of a surface having uniform temperature is captured by the infrared imaging device. In order to reduce the influence of the fixed pattern noise, data of the fixed pattern noise (fixed pattern noise data) may be acquired, and the fixed pattern noise data may be subtracted from an image signal obtained by capturing an image of a subject. The fixed pattern noise data is acquired, for example, in a state where a light source having a uniform amount of light is installed at the front of the infrared detector and infrared rays incident on the infrared detector are cut off from the outside.

Since the fixed pattern noise fluctuates depending on a change in the environment such as temperature, there is a demand for the fixed pattern noise data to be repeatedly acquired in the course of imaging. In order to meet such a demand, a technique is proposed in which a shutter mechanism is provided within an infrared imaging device, and infrared rays incident on an infrared detector are cut off from the outside to acquire fixed pattern noise data (see, for example, JP1998-142065A (JP-H10-142065A)). However, in JP1998-142065A (JP-H10-142065A), the shutter mechanism unnecessary for original imaging is required to be disposed in the periphery of an optical system and the infrared detector, which leads to an increase in cost or an increase in the size of a device. In addition, there is also a disadvantage of an increase in the number of failure occurrence points.

JP2001-336983A discloses an infrared imaging device capable of acquiring fixed pattern noise data while a shutter mechanism is not required. The infrared imaging device disclosed in JP2001-336983A includes an optical system that condenses light radiated from a target object (subject) to cause the condensed light to be incident on an infrared detector, and a subtractor that outputs image data obtained by subtracting fixed pattern noise data from an image signal (image data) which is output by the infrared detector. The optical system is positioned at a focusing location by a focus adjustment mechanism during a normal imaging.

In JP2001-336983A, the optical system is controlled to be in a non-focused state during the acquisition of the fixed pattern noise data. The optical system is set to be in a non-focused state, light from all directions within an observation field view of the optical system is uniformly incident on the infrared detector. That is, a flux of light incident on the optical system from various directions is not imaged at a specific point of the infrared detector, and is uniformly incident on the detection surface of the infrared detector. In this state, an error between output image data of the subtractor and expected value data of the fixed pattern noise is obtained. A negative feedback given to the subtractor is performed using return data based on this error as the fixed pattern noise data, and the return data when the output image data of the subtractor and the expected value data are set to be substantially the same as each other is held as the fixed pattern noise data.

In JP2001-336983A, image data obtained in a state where a light source having a uniform amount of light is installed at the front of the infrared detector and infrared rays incident on the infrared detector are cut off from the outside is used as the expected value data of the fixed pattern noise. The optical system is set to be in a non-focused state, and light from all directions within an observation field view is caused to be incident on the detection surface of the infrared detector. Thereby, it is possible to cause infrared rays having a uniform amount to be incident on each detector element, and to obtain the fixed pattern noise data without using the shutter mechanism.

SUMMARY OF THE INVENTION

In the infrared imaging device disclosed in JP2001-336983A, light from all directions within the observation field view of the optical system is required to be uniformly incident on the detection surface of the infrared detector in order to appropriately acquire the fixed pattern noise data. However, in an actual usage environment, the light from all directions within the observation field view is not necessarily capable of being incident on the detection surface of the infrared detector. Even in a case where the optical system is set to be in a non-focused state, a pattern occurs in an infrared image. In other words, portions having much incident infrared rays and portions having little incident infrared rays are distributed within the image. In the infrared imaging device disclosed in JP2001-336983A, in a case where there is a difference between the amount of infrared rays incident on a certain region of the detection surface of the infrared detector and the amount of infrared rays incident on another region, it is not possible to obtain appropriate fixed pattern noise data.

The present invention is contrived in view of such circumstances, and an object thereof is to provide an infrared imaging device capable of acquiring fixed pattern noise data even in a case where a shutter mechanism is not required, and light from all directions within an observation field view is not uniformly incident on the detection surface of an infrared detector.

In addition, another object of the present invention is to provide a method of updating fixed pattern noise data in such an infrared imaging device.

In order to achieve the above objects, according to the present invention, there is provided an infrared imaging device comprising: an infrared detector including a plurality of detector elements that detect incident infrared rays; a noise correction processing unit that subtracts fixed pattern noise data from a detection signal of the infrared rays detected by the plurality of detector elements, to thereby remove fixed pattern noise from the infrared detection signal; and a noise data update processing unit including a signal component amount calculation unit that calculates an amount of a signal component dependent on the infrared rays incident on the infrared detector included in the infrared detection signal, on the basis of multiple times of infrared detection signals detected by the infrared detector, a fixed pattern noise calculation unit that calculates an amount of a fixed pattern noise component on the basis of the infrared detection signal and the amount of a signal component calculated by the signal component amount calculation unit, and a data update unit that updates the fixed pattern noise data with the amount of a fixed pattern noise component calculated by the fixed pattern noise calculation unit, wherein the signal component amount calculation unit calculates dispersion or standard deviation of multiple times of the infrared detection signals detected by each detector element to be processed, and calculates the amount of a signal component dependent on incident infrared rays on the basis of the calculated dispersion or standard deviation.

In the infrared imaging device of the present invention, the fixed pattern noise calculation unit may calculate a difference between the infrared detection signal and the amount of a signal component calculated by the signal component amount calculation unit as the amount of a fixed pattern noise component.

In the infrared imaging device of the present invention, the noise data update processing unit may further include a determination unit that calculates a difference between the amount of a fixed pattern noise component calculated by the fixed pattern noise calculation unit and the fixed pattern noise data before update with respect to each detector element, and determines whether the difference is equal to or less than a first threshold value. In that case, the data update unit may update the fixed pattern noise data with the amount of a fixed pattern noise component calculated by the fixed pattern noise calculation unit, with respect to a detector element in which the difference is determined to be equal to or less than the first threshold value.

In the above, the data update unit may not update the fixed pattern noise data with respect to a detector element in which the difference is determined to be larger than the first threshold value.

In a case where a percentage of the number of detector elements in which the difference in a certain region exceeds the first threshold value is higher than a second threshold value, the data update unit may not update the fixed pattern noise data with respect to detector elements included in the region.

The infrared imaging device of the present invention may further comprise a temperature measurement unit that measures a temperature. In that case, the data update unit may update the fixed pattern noise data in a case where a difference between a temperature measured by the temperature measurement unit and a temperature during previous update of the fixed pattern noise data is equal to or larger than a temperature threshold value.

The data update unit may update the fixed pattern noise data periodically repeatedly.

The infrared imaging device of the present invention may further comprise an optical system which is capable of controlling an imaging position and a focus position control unit that controls the imaging position of the optical system, and infrared rays may be incident on the plurality of detector elements of the infrared detector through the optical system. In that case, the signal component amount calculation unit may calculate dispersion or standard deviation of multiple times of infrared detection signals detected by the detector elements in a state where the focus position control unit controls the imaging position of the optical system and the optical system is controlled to be in a non-focused state.

In addition, according to the present invention, there is provided a method of updating fixed pattern noise data indicating fixed pattern noise in an infrared detector including a plurality of detector elements, the method comprising: a step of detecting infrared rays using the infrared detector; a step of calculating dispersion or standard deviation of multiple times of infrared detection signals obtained by performing the step of detecting infrared rays multiple times; a step of calculating an amount of a signal component dependent on infrared rays incident on the detector elements included in the infrared detection signals, on the basis of the calculated dispersion or standard deviation; a step of calculating an amount of a fixed pattern noise component on the basis of the infrared detection signals and the amount of a signal component calculated in the step of calculating an amount of a signal component; and a step of updating the fixed pattern noise data with the amount of a fixed pattern noise component calculated in the step of calculating an amount of a fixed pattern noise component.

The method of updating fixed pattern noise data according to the present invention may further comprise a step of calculating a difference between the calculated amount of a fixed pattern noise component and the fixed pattern noise data before update, in advance of the step of updating fixed pattern noise data. In that case, the step of updating fixed pattern noise data may include updating the fixed pattern noise data with the calculated amount of a fixed pattern noise component, with respect to a detector element in which the difference between the calculated amount of a fixed pattern noise component and the fixed pattern noise data before update is equal to or less than a threshold value.

In the infrared imaging device and the method of updating fixed pattern noise data according to the present invention, the detection of infrared rays using the infrared detector is performed multiple times, and the dispersion or standard deviation of multiple times of infrared detection signals is calculated. Shot noise is dominant as to the fluctuation of the detection signals in a case where infrared rays are detected multiple times, and the magnitude of the fluctuation of the detection signals due to the shot noise depends on the amount of a signal component dependent on infrared rays incident on the detector elements. In a case where this relation is used, the amount of a signal component dependent on infrared rays incident on the detector elements included in the infrared detection signals can be calculated on the basis of the dispersion or standard deviation of the infrared detection signals. The amount of a fixed pattern noise component is calculated on the basis of the infrared detection signals and the calculated amount of a signal component, and the fixed pattern noise data is updated with the calculated amount of a fixed pattern noise component. In this manner, it is possible to acquire the fixed pattern noise data even in a case where a shutter mechanism is not required, and light from all directions within an observation field view is not uniformly incident on the detection surface of the infrared detector.

BRIEF DESCRIPTION OF THE DRAWINGS

FIG. 8 is a flow diagram illustrating a procedure of a method of updating fixed pattern noise data according to the second embodiment of the present invention.

FIG. 9 is a diagram illustrating a division example of a region of an image.

FIG. 10 is a block diagram illustrating an infrared imaging device according to a third embodiment of the present invention.

DESCRIPTION OF EMBODIMENTS

Figure 1:
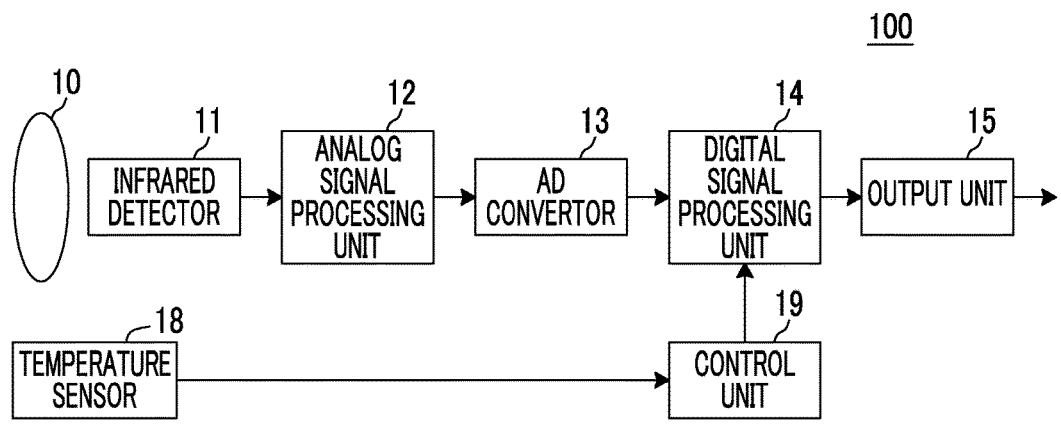
FIG. 1 is a block diagram illustrating an infrared imaging device according to a first embodiment of the present invention.

Hereinafter, embodiments of the present invention will be described in detail with reference to the accompanying drawings. FIG. 1 shows an infrared imaging device according to a first embodiment of the present invention. An infrared imaging device 100 includes an optical system 10, an infrared detector 11, an analog signal processing unit 12, an analog to digital (AD) convertor 13, a digital signal processing unit 14, an output unit 15, a temperature sensor 18, and a control unit 19. The infrared imaging device 100 may be one completed product, and may be a module used in a state of being incorporated into another product.

The optical system 10 is an imaging optical system including one or more lenses. The infrared detector 11 is an infrared imaging element (infrared sensor), and captures an optical image formed by the optical system 10 to convert the captured image into an electrical signal. The infrared detector 11 includes a plurality of detector elements that detects incident infrared light (infrared rays). In the infrared detector 11, the plurality of detector elements are arranged, for example, two-dimensionally. Infrared rays are incident on the infrared detection surface (hereinafter, also called the detection surface simply) of the infrared detector 11 through the optical system 10. The position of the detection surface of the infrared detector 11 is preferably coincident with the position of the imaging surface of the optical system 10. An infrared image is formed on the basis of a detection signal of each detector element of the infrared detector 11.

The infrared detector 11 detects infrared rays of a range having, for example, a wavelength of 0.83 µm to 1,000 µm. It is preferable that the infrared detector 11 detects far-infrared rays of a range having, particularly, a wavelength of 6 µm to 1,000 µm. A thermal type infrared sensor such as a bolometer or silicon on insulator (SOI) diode type can be used in the infrared detector 11.

The analog signal processing unit 12 performs analog electrical processing on an infrared detection signal which is output by the infrared detector 11. The analog signal processing unit 12 typically includes an amplifier that amplifies the infrared detection signal. The AD convertor 13 samples the infrared detection signal, and converts the sampled infrared detection signal into digital data (digital signal value). The digital signal processing unit 14 performs signal processing on the infrared detection signal converted into digital data by the AD convertor 13. The signal processing in the digital signal processing unit 14 includes a process of correcting fixed pattern noise (hereinafter, also called fixed pattern noise (FPN)) of the infrared detection signal and a process of updating FPN data used in the correction process.

The control unit 19 controls the entire device. A programmable logic device (PLD) such as, for example, a field-programmable gate array (FPGA) can be used in the control unit 19. The control unit 19 switches the operating mode of the infrared imaging device 100 between a normal imaging mode and an update mode of FPN data. The control unit 19 controls signal processing in the digital signal processing unit 14 in accordance with the operating mode through a control signal. Specifically, the digital signal processing unit 14 is caused to perform the FPN correction process during the normal imaging mode, and is caused to perform the FPN data update process during the update mode of FPN data.

The temperature sensor (temperature measurement unit) 18 measures the temperatures in and around the infrared detector 11. The control unit 19 may switch the operating mode to the update mode of FPN data on the basis of a change in the temperature measured by the temperature sensor 18. For example, in a case where a difference between the temperature measured by the temperature sensor 18 and the temperature during the previous FPN data update is equal to or larger than a threshold value (temperature threshold value), the update of FPN data may be performed by switching the operating mode to the update mode of FPN. In addition, the control unit 19 may periodically repeatedly switch the operating mode to the update mode of FPN data during the normal imaging mode. In that case, the operating mode may be switched to the update mode of FPN data after a certain period of time has elapsed from the previous update time of FPN data. The update period of FPN data is not required to be constant. The operating mode is periodically switched to the update mode of FPN data, and thus it is possible to periodically update the FPN data.

The output unit 15 outputs an infrared detection signal (image data) on which signal processing is performed by the digital signal processing unit 14. The output unit 15 outputs, for example, the infrared detection signal onto a display device (not shown in FIG. 1) or the like, and displays an infrared image on a display screen. Alternatively, the infrared detection signal may be output to an external storage device (not shown in FIG. 1) such as a hard disk device or a memory card, and be stored in the external storage device. Further, the infrared detection signal may be transmitted to an external server or a processing device through a network, a communication cable or the like. The output unit 15 includes, for example, a digital analog (DA) convertor that converts a digital signal into an analog signal, and outputs the infrared detection signal as an analog signal. The output unit 15 may output the infrared detection signal as a digital signal.

Figure 2:
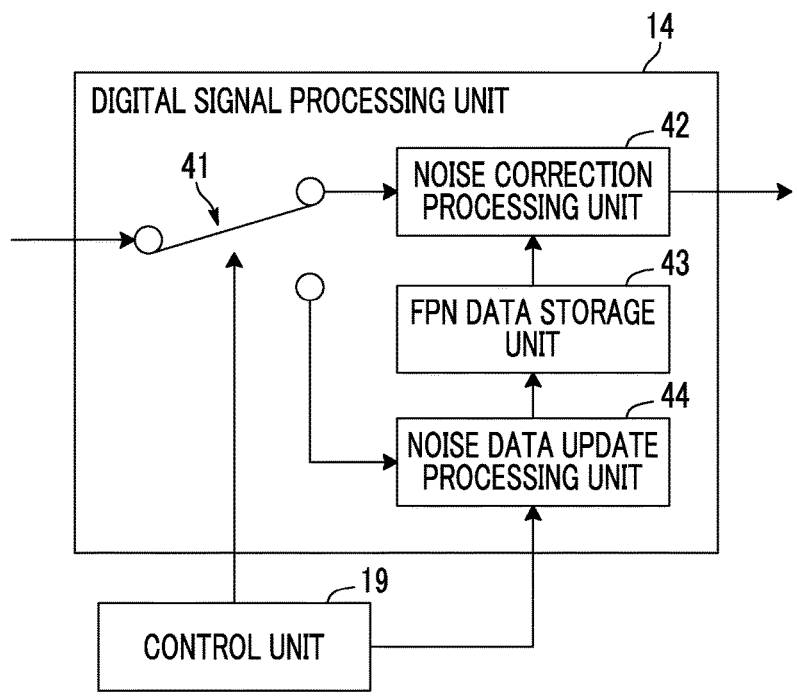
FIG. 2 is a block diagram illustrating a configuration of a digital signal processing unit.

FIG. 2 shows a configuration of the digital signal processing unit 14. The digital signal processing unit 14 includes a switch 41, a noise correction processing unit 42, an FPN data storage unit 43, and a noise data update processing unit 44. The digital signal processing unit 14 is typically configured as large scale integration (LSI) such as a digital signal processor (DSP). The DSP typically includes a processor, a read only memory (ROM) that stores a command for the processor, and a random access memory (RAM) that stores data, and these components are connected to each other through a bus. The processor operates in accordance with a command stored in the ROM, and thus the functions of the noise correction processing unit 42, the noise data update processing unit 44 and the like are realized. The DSP may have an interface for connection to an external storage device or the like.

Digital data of the infrared detection signal (hereinafter, the infrared detection signal converted into digital data is sometimes called the infrared detection signal without particular discrimination) which is output by the AD convertor 13 (see FIG. 1) is input to the switch 41. The switch 41 selectively outputs the infrared detection signal to the noise correction processing unit 42 and the noise data update processing unit 44. The changeover of the switch 41 is performed on the basis of, for example, a control signal which is output by the control unit 19. The control unit 19 outputs the infrared detection signal from the switch 41 to the noise correction processing unit 42 during the normal imaging mode. The control unit 19 outputs the infrared detection signal from the switch 41 to the noise data update processing unit 44 during the update mode of FPN data. In addition, the control unit instructs the noise data update processing unit 44 to update the FPN data.

The FPN data storage unit 43 stores the FPN data. Here, the term FPN indicates a noise component included in a detection signal of each detector element which is specific to each detector element (each pixel) of the infrared detector 11 (see FIG. 1). The FPN data is data indicating FPN of each detector element, and is a set of FPN of each detector element. The FPN data storage unit 43 may be configured such that a light source having a uniform amount of light may be installed at the front of the infrared detector 11 in an initial state, and that the infrared detection signal detected by the infrared detector 11 in a state where infrared rays incident on the infrared detector 11 from the outside are cut off is stored as the FPN data. The FPN data storage unit 43 may be configured, for example, inside the RAM included in the digital signal processing unit 14, and may be constituted by a rewritable non-volatile memory such as an electrically erasable and programmable read only memory (EEPROM).

The noise correction processing unit 42 refers to the FPN data storage unit 43 to correct (remove) an FPN component included in the infrared detection signal. More specifically, the FPN is removed from the infrared detection signal by subtracting the FPN data from the infrared detection signal. The noise correction processing unit 42 removes a noise component specific to each detector element by subtracting the FPN data of the detector element from the infrared detection signal which is output by each detector element included in the infrared detector 11, and outputs a signal component dependent on the amount of incident infrared rays.

The infrared detection signal detected by the infrared detector 11 is input to the noise data update processing unit 44 through the switch 41. Multiple times of infrared detection signals are input to the noise data update processing unit 44. The noise data update processing unit 44 calculates the amount of the FPN component (its estimation value) on the basis of multiple times of infrared detection signals. More specifically, the noise data update processing unit 44 calculates the amount of a signal component dependent on infrared rays incident on the infrared detector which is included in the infrared detection signals, on the basis of multiple times of infrared detection signals. The noise data update processing unit 44 calculates the amount of the FPN component by subtracting the calculated amount of a signal component from the infrared detection signals. The noise data update processing unit 44 updates the FPN data stored in the FPN data storage unit 43 with the calculated amount of the FPN component.

Here, updating the FPN data means that the FPN data stored in the FPN data storage unit 43 is rewritten with new data. The update of the FPN data includes not only update of all the detector elements included in the infrared detector 11 at a time, but also partial update performed on some of all the detector elements. For example, when the infrared detector 11 includes 100 detector elements, pieces of FPN data of these 100 detector elements may be updated at a time, and pieces of FPN data of 40 to 70 out of 100 detector elements may be updated per one-time update.

Figure 3:
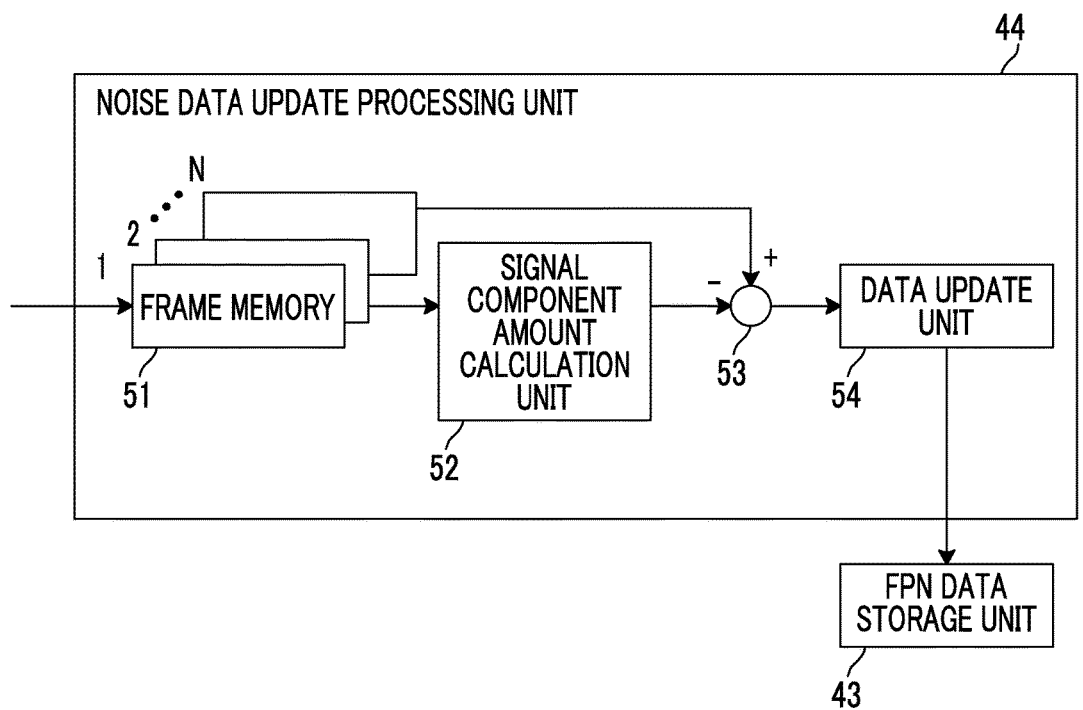
FIG. 3 is a block diagram illustrating a configuration of a noise data update processing unit.

FIG. 3 shows a configuration of the noise data update processing unit 44. The noise data update processing unit 44 includes a frame memory 51, a signal component amount calculation unit 52, a fixed pattern noise calculation unit (subtractor) 53, and a data update unit 54. The frame memory 51 stores an infrared image captured by the infrared detector 11. The frame memory 51 stores infrared images of multiple frames from, for example, a frame 1 to a frame N (N is an integer of 2 or greater). The frame memory 51 may be a portion of the noise data update processing unit 44, and may be provided outside the noise data update processing unit 44.

Figure 4:
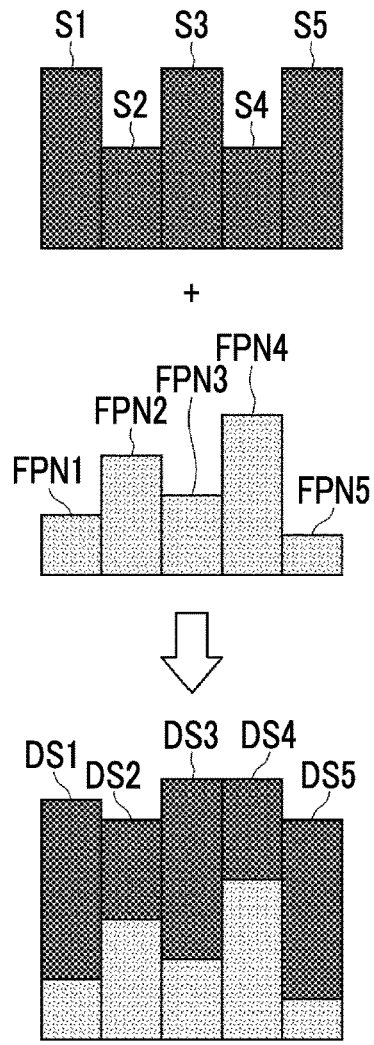
FIG. 4 is a diagram illustrating signal components dependent on incident infrared rays, fixed pattern noise components, and infrared detection signals.

Here, a description will be given of a relationship between infrared detection signals detected by the detector elements of the infrared detector 11, and fixed pattern noise components and signal components dependent on incident infrared rays included in the infrared detection signals. FIG. 4 is a diagram illustrating signal components dependent on incident infrared rays, fixed pattern noise components, and infrared detection signals. FIG. 4 shows signal components dependent on incident infrared rays, fixed pattern noise components, and infrared detection signals with respect to five detector elements of detector elements 1 to 5.

Generally, infrared rays having different amounts for each detector element depending on the image of a subject are incident on each detector element. Therefore, as shown in FIG. 4, signal components S1 to S5 dependent on incident infrared rays are not equal to each other in many cases. On the other hand, fixed pattern noise components FPN1 to FPN5 of each detector element are specific to the detector elements, and are not dependent on the amounts of the signal components. Infrared detection signals DS1 to DS5 of each detector element have the fixed pattern noise components FPN1 to FPN5 added to the signal components S1 to S5, respectively. The signal components S1 to S5 are detected together with the fixed pattern noise components FPN1 to FPN5, and thus it is not possible to discriminate which portions of the infrared detection signals DS1 to DS5 are the signal components S1 to S5, and which portions of the infrared detection signals are the fixed pattern noise components FPN1 to FPN5.

Figure 5:
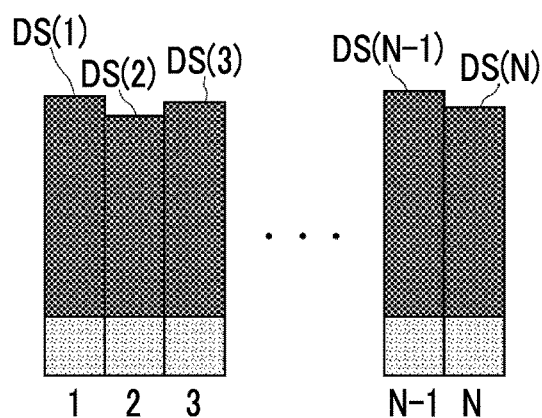
FIG. 5 is a diagram illustrating multiple times of infrared detection signals.

FIG. 5 shows multiple times of infrared signals which are detected in one detector element. For example, the infrared detection signals are assumed to be continuously detected N times from a frame 1 to a frame N with respect to a certain detector element. Here, k is set to an integer between 1 and N, and an infrared detection signal of a k-th frame is indicated by DS(k). The amount of a fixed pattern noise component included in the infrared detection signal DS(k) of each frame is constant. In a case where it is assumed that there is no change in the amount of infrared rays incident on the detector element from the frame 1 to the frame N, the amounts of signal components dependent on incident infrared rays included in the infrared detection signal DS(k) of each frame are becomes equal to each other. However, in reality, a fluctuation occurs between the frames in the infrared detection signal DS(k) due to an influence such as shot noise.

As to the fluctuation of the infrared detection signal in each detector element, shot noise is dominant. The degree of the fluctuation of the infrared detection signal due to the shot noise is indicated by the standard deviation of the infrared detection signal. In addition, the fluctuation of the infrared detection signal due to the shot noise depends on the amount of a signal component (the amount of incident infrared rays). More specifically, the degree of the fluctuation of the infrared detection signal due to the shot noise is equal to the ½ power of the amount of a signal component. In a case where this relation is used, the amount of a signal component (its estimation value) dependent on incident infrared rays in each detector element can be calculated from the fluctuation of the infrared detection signal in each detector element. That is, the amount of a signal component in each detector element can be calculated from the dispersion or standard deviation of the infrared detection signal in each detector element. The amount of a fixed pattern noise component can be calculated by subtracting the amount of a signal component from the infrared detection signal.

Referring back to FIG. 3, the signal component amount calculation unit 52 refers to the frame memory 51 to calculate the dispersion or standard deviation of multiple times of infrared detection signals detected by each detector element to be processed. The signal component amount calculation unit 52 calculates the amount of a signal component dependent on incident infrared rays included in the infrared detection signal, on the basis of the calculated dispersion or standard deviation. More specifically, the signal component amount calculation unit 52 sets a value of the calculated dispersion to the amount of a signal component. Alternatively, a value obtained by raising the calculated standard deviation to the power of 2 is set to the amount of a signal component.

In the signal component amount calculation unit 52, the number of infrared detection signals (the number of frames) used in the calculation of the dispersion or standard deviation is preferably equal to or greater than 10 frames, and is further preferably equal to or greater than 20 frames. As the number of frames increases, the accuracy of the amount of a signal component, dependent on incident infrared rays included in the infrared detection signal, which is calculated in the signal component amount calculation unit 52 becomes higher. On the other hand, there is an increased possibility of a shift in a subject becoming larger as the number of frames increases. The signal component amount calculation unit 52 may change the number of infrared detection signals used in the calculation of the dispersion or standard deviation in accordance with a shift in the subject. For example, as to 20 frames' worth of infrared detection signals, an average value of 10 frames' worth of infrared detection signals of the first half and an average value of 10 frames' worth of infrared detection signals of the second half are calculated, and a difference between the average value of the first half and the average value of the second half is obtained. In a case where the difference between the average value of the first half and the average value of the second half is small, the dispersion or standard deviation is calculate using 20 frames' worth of infrared detection signals. In a case where the difference between the average value of the first half and the average value of the second half is large, the dispersion or standard deviation may be calculated using 10 frames' worth of infrared detection signals of the first half or the second half.

The infrared detection signal and the amount of a signal component calculated by the signal component amount calculation unit 52 are input to the fixed pattern noise calculation unit 53. The infrared detection signal which is input to the fixed pattern noise calculation unit 53 is, for example, an average value of multiple times of infrared detection signals stored in the frame memory 51. Instead thereof, one of multiple times of infrared detection signals stored in the frame memory 51 may be input to the fixed pattern noise calculation unit 53. Further, the central value (median) or most frequent value (mode) of multiple times of infrared detection signals stored in the frame memory 51 may be input to the fixed pattern noise calculation unit 53. The fixed pattern noise calculation unit 53 subtracts the amount of a signal component calculated by the signal component amount calculation unit 52 from the infrared detection signal and outputs the subtracted amount. The output performed by the fixed pattern noise calculation unit 53 is equivalent to the amount of the FPN component. The data update unit 54 updates FPN data of a detector element of interest stored in the FPN data storage unit 43 with the amount of the FPN component of the detector element of interest which is output by the fixed pattern noise calculation unit 53.

Meanwhile, the output signal of the infrared detector 11 (see FIG. 1) is amplified in the analog signal processing unit 12. In addition, the output signal of the infrared detector 11 may be converted into a current value or a voltage value in the analog signal processing unit 12. In that case, a value obtained by raising the dispersion value or standard deviation calculated in the signal component amount calculation unit 52 to the power of 2 and the amount of a signal component included in the output signal of each detector element of the infrared detector 11 may not be coincident with each other as they are. In the calculation of the amount of a signal component and the amount of the FPN component, a process such as the multiplication of the calculated value by a conversion coefficient may be performed on the consideration of a signal amplification factor in the analog signal processing unit 12, the efficiency of conversion into a current value or a voltage value, and the like.

Figure 6:
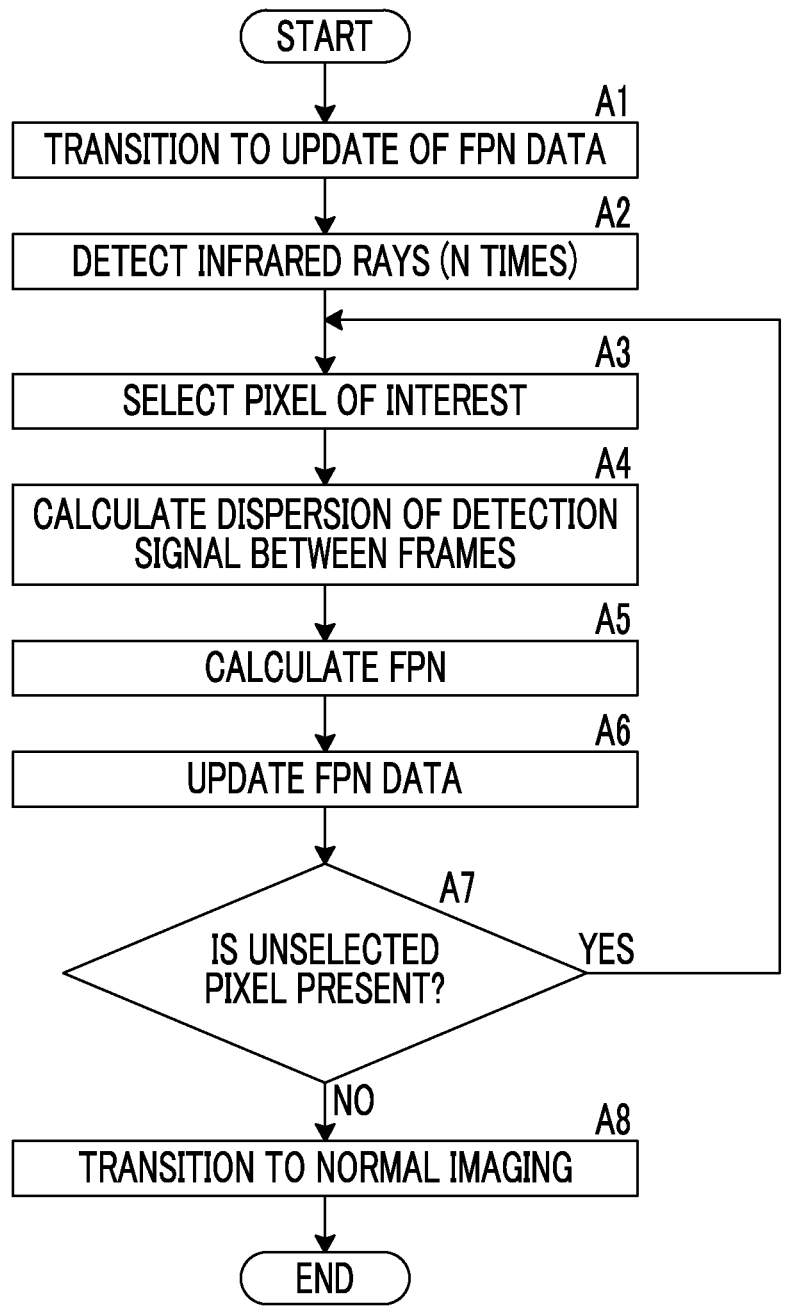
FIG. 6 is a flow diagram illustrating a procedure of a method of updating fixed pattern noise data according to the first embodiment of the present invention.

Hereinafter, an operation procedure will be described. FIG. 6 shows a procedure of a method of updating fixed pattern noise data according to the first embodiment of the present invention. At first, the infrared imaging device 100 operates in the normal imaging mode. The infrared detection signal detected by the infrared detector 11 is input to the digital signal processing unit 14 through the analog signal processing unit 12 (see FIG. 1) and the AD convertor 13. The digital signal processing unit 14 performs an FPN correction process of removing FPN from the infrared detection signal. The infrared detection signal having the FPN removed therefrom is output from the output unit 15.

The control unit 19 switches the operating mode from the normal imaging mode to the update mode of FPN data (step A1). The control unit 19 switches the operating mode to the update mode of FPN data, for example, after a difference between temperature measured by the temperature sensor 18 and temperature during the previous update of FPN data is set to be equal to or larger than a temperature threshold value. Alternatively, the control unit 19 switches the operating mode to the update mode of FPN data in a case where a time equal to or later than a reference time has elapsed from the previous update time of FPN data. The operating mode is switched to the update mode of FPN data, and thus signal processing in the digital signal processing unit 14 is switched from an FPN correction process to an update process of FPN data.

The infrared detector 11 detects infrared rays multiple times (step A2). In each time of detection. The infrared detection signal which is output by the infrared detector 11 is input to the digital signal processing unit 14 through the analog signal processing unit 12 and the AD convertor 13. The noise data update processing unit 44 (see FIG. 2) of the digital signal processing unit 14 inputs each time of infrared detection signal through the switch 41. Each time of infrared detection signal detected by each detector element of the infrared detector 11 is stored in the frame memory 51 (see FIG. 3).

The signal component amount calculation unit 52 selects the detector element of interest (pixel of interest) from the detector elements included in the infrared detector 11 (step A3). The signal component amount calculation unit 52 refers to the frame memory 51 to calculate the dispersion or standard deviation of multiple times of infrared detection signals of the detector element of interest (step A4). The signal component amount calculation unit 52 calculates, for example, the dispersion of the infrared detection signals of a frame 1 to a frame N which are stored in the frame memory 51. As described above, the value of the dispersion of the infrared detection signals corresponds to the amount of an infrared signal component dependent on incident infrared rays included in the infrared detection signal.

The fixed pattern noise calculation unit 53 inputs an infrared detection signal of the detector element of interest from the frame memory 51, and subtracts a value obtained by raising the value of the dispersion or the standard deviation calculated in step A4 to the power of 2 (the amount of a signal component) from the infrared detection signal, to thereby calculate the amount of the FPN component of the detector element of interest (step A5). The data update unit 54 rewrites the FPN data of the detector element of interest stored in the FPN data storage unit 43 with the amount of the FPN component of the detector element of interest which is output by the fixed pattern noise calculation unit 53 (step A6).

The noise data update processing unit 44 determines whether a detector element which is not selected as the detector element of interest is present (step A7). In a case where an unselected detector element is present, the process returns to step A3, and the next detector element is selected. The noise data update processing unit 44 repeatedly performs the processes of step A3 to step A7 until the unselected detector element is not present, for example, while performing raster scanning the position of the detector element of interest. Thereby, the FPN data of each detector element included in the infrared detector 11 is updated.

In a case where it is determined in step A7 that the unselected detector element is not present, the control unit 19 switches the operating mode from the update mode of FPN data to the normal imaging mode (step A8). The operating mode is switched to the normal imaging mode, and thus signal processing in the digital signal processing unit 14 is switched from an update process of FPN data to an FPN correction process. The digital signal processing unit 14 performs the FPN correction process using the FPN data updated in step A6.

In the present embodiment, the dispersion or standard deviation of multiple times of infrared detection signals is calculated, and the amount of a signal component (its estimation value) dependent on incident infrared rays included in the infrared detection signal is calculated on the basis of the dispersion or standard deviation. In a case where it is assumed that a subject does not move, the amount of infrared rays incident on each detector is constant between the frames. It is considered that a fluctuation in the infrared detection signal between the frames is due to the influence of shot noise. In the present embodiment, the amount of a signal component is calculated from the degree of a fluctuation in the infrared detection signal, using the fact that a fluctuation in the infrared detection signal due to the shot noise depends on the amount of a signal component. By subtracting the amount of a signal component calculated in this manner from the infrared detection signal, it is possible to calculate the amount of the FPN component, and to update the FPN data with the calculated amount of the FPN component. In the present embodiment, it is not necessary to provide a separate shutter mechanism in order to acquire the FPN data.

In the present embodiment, the FPN data is updated on the basis of fluctuations in multiple times of infrared detection signals. For this reason, unlike JP2001-336983A, light from all directions within an observation field view is not required to be caused to uniformly incident on the detection surface of the infrared detector, and therefore, the optical system 10 is not required to be controlled to be in a non-focused state when the FPN data is updated. In the present embodiment, the normal imaging mode and the update mode of FPN data are not required to be separated from each other, and the FPN data may be updated while performing normal imaging. Specifically, in FIG. 2, the FPN data may be updated by the noise data update processing unit 44 while the FPN component included in the infrared detection signal is corrected (removed) by the noise correction processing unit 42. In that case, it is possible to update the FPN data in a state where imaging is continued.

Figure 7:
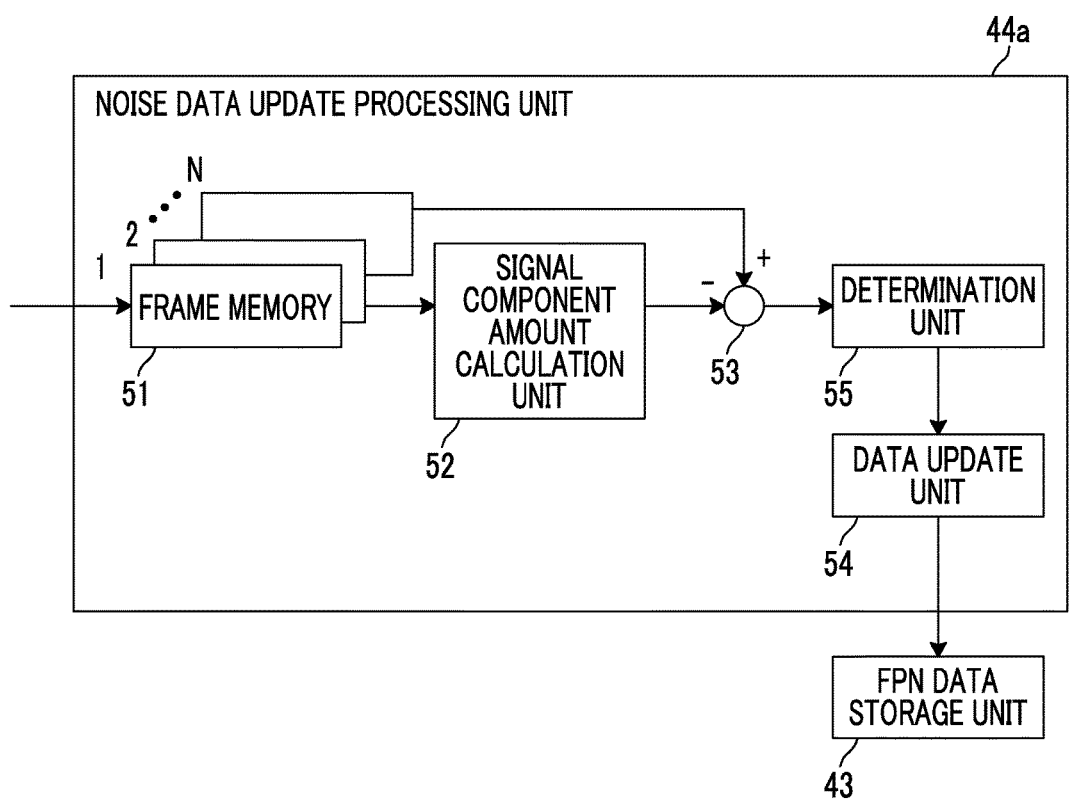
FIG. 7 is a block diagram illustrating a configuration of a noise data update processing unit in an infrared imaging device according to a second embodiment of the present invention.

Subsequently, a second embodiment of the present invention will be described. FIG. 7 shows a configuration of a noise data update processing unit in an infrared imaging device according to the second embodiment of the present invention. The configuration of the infrared imaging device is the same as that of the infrared imaging device 100 according to the first embodiment shown in FIG. 1, and the configuration of a digital signal processing unit is the same as the configuration of the digital signal processing unit 14 used in the first embodiment shown in FIG. 2. In the present embodiment, a noise data update processing unit 44a included in the digital signal processing unit includes a determination unit 55 in addition to the configuration of the noise data update processing unit 44 used in the first embodiment shown in FIG. 3. The other points may be the same as those in the first embodiment.

The determination unit 55 compares the amount of the FPN component which is output by the fixed pattern noise calculation unit 53 with the FPN data stored in the FPN data storage unit 43, with respect to each detector element. The determination unit 55 calculates a difference between the amount of the FPN component which is output by the fixed pattern noise calculation unit 53 and the FPN data stored in the FPN data storage unit 43, and determines whether the difference (the absolute value) is equal to or less than a threshold value (first threshold value). The first threshold value is set to, for example, 20% of the value of the FPN data stored in the FPN data storage unit 43. The first threshold value may not be a fixed value, and the first threshold value may be changed in accordance with a change in temperature from the previous update of FPN data to this update of FPN data. For example, as a change in temperature increases, the first threshold value may be increased. In a case where it is determined that the difference is equal to or less than the threshold value, the determination unit 55 updates the FPN data stored in the FPN data storage unit 43 with the amount of the FPN component which is output by the fixed pattern noise calculation unit 53, through the data update unit 54. In a case where it is determined that the difference is larger than the threshold value, the FPN data is not updated with respect to the detector element. In that case, the FPN data stored in the FPN data storage unit 43 is continuously used.

Hereinafter, an operation procedure in the second embodiment will be described. FIG. 8 shows a procedure of a method of updating fixed pattern noise data according to the second embodiment of the present invention. Meanwhile, steps B1 to B5 are the same as steps A1 to A5 in FIG. 6, and thus the description thereof will not be given.

The determination unit 55 calculates a difference between the amount of the FPN component of the detector element of interest calculated in step B5 and the FPN data of the detector element stored in the FPN data storage unit 43 (step B6). The determination unit 55 determines whether the difference calculated in step B6 is not more than the threshold value (step B7). In a case where it is determined in step B7 that the difference is not more than the threshold value, the data update unit 54 rewrites the FPN data of the detector element of interest stored in the FPN data storage unit 43 with the amount of the FPN component of the detector element of interest which is output by the fixed pattern noise calculation unit 53 (step B8). When it is determined in step B7 that the difference is larger than the threshold value, step B8 is skipped, and the FPN data of the present detector element of interest is not updated.

The noise data update processing unit 44 determines whether a detector element which is not selected as the detector element of interest is present (step B9). This step is the same as step A7 in FIG. 6. In a case where an unselected detector element is present, the process returns to step B3, and the next detector element is selected. In a case where it is determined in step B9 that the unselected detector element is not present, the control unit 19 switches the operating mode from the update mode of FPN data to the normal imaging mode (step B10). This step is the same as step A8 in FIG. 6. The operating mode is switched to the normal imaging mode, and thus signal processing in the digital signal processing unit 14 is switched from an update process of FPN data to an FPN correction process. The digital signal processing unit 14 performs the FPN correction process using the FPN data updated at least partially.

Here, in a case where infrared rays incident on the detector element of the infrared detector 11 are constant while incident infrared rays are detected multiple times in the infrared detector 11, the shot noise is dominant as to the fluctuation of the infrared detection signal, and thus the amount of a signal component dependent on incident infrared rays can be calculated on the basis of the degree of the fluctuation of the infrared detection signal. However, in a case where a subject moves while multiple times of detections are performed, infrared rays incident on the detector element change, and thus a great fluctuation occurs in the infrared detection signal due to such a change. In this case, an error between the amount of a signal component dependent on incident infrared rays calculated on the basis of the degree of the fluctuation of the infrared detection signal and the actual amount of a signal component dependent on incident infrared rays becomes larger. In a case where a large error is included in the calculated amount of a signal component, a large error also occurs the amount of the FPN component calculated in the noise data update processing unit 44a.

In the present embodiment, in a case where a difference between the amount of the FPN component calculated in the noise data update processing unit 44a and the FPN data before update stored in the FPN data storage unit 43 is large on the assumption that the amount of the FPN component fluctuates greatly before and after update, the reliability of the calculated amount of the FPN component is assumed to be low, and the FPN data is not updated. In this manner, it is possible to continuously use the FPN data stored in the FPN data storage unit 43 without using the amount of the FPN component having a large error with respect to a portion such as a portion in which a subject moves.

In the above, the presence or absence of the update of FPN data is determined for each detector element, but this determination may be performed for each region. More specifically, the noise data update processing unit 44a may not perform the update of FPN data in a region including many detector elements in which a difference between the calculated amount of the FPN component and the FPN data stored in the FPN data storage unit 43 is larger than the threshold value.

For example, the determination unit 55 of the noise data update processing unit 44a counts the number of detector elements in which the difference between the calculated amount of the FPN component and the FPN data stored in the FPN data storage unit 43 in a certain region is larger than the threshold value, and divides the number by the total number of detector elements included in the region, to thereby calculate a percentage of detector elements in which a difference in the region is larger than the threshold value. The determination unit 55 may perform a threshold value process on the calculated percentage, and determine that the update of FPN data is not performed on the detector elements included in the region when the percentage is higher than a threshold value (second threshold value). The second threshold value is set to, for example, 50% of the entire region.

FIG. 9 shows a division example of a region of an image. In this example, the entirety (effective pixel region) of an infrared image is divided into four parts in a longitudinal direction and a traverse direction, and a total of sixteen regions of regions R1 to R16 are set within the image. The determination unit 55 calculates a percentage of detector elements in which the difference is larger than the threshold value, in the regions R1 to R16, and determines whether the calculated percentage is higher than the threshold value. For example, in a case where the percentage is larger than the threshold value in the regions R11, R12, R15, and R16, the data update unit 54 does not perform the update of FPN data with respect to detector elements included in the regions R11, R12, R15, and R16, and updates the FPN data with the calculated amount of the FPN component with respect to detector elements included in other regions, that is, the regions R1 to R10, R13, and R14. In this manner, the FPN data can be restrained from being collectively updated in a region including many detector elements having a large error of the calculated amount of the FPN component.

Meanwhile, a region is not required to be set in advance. For example, when a detector element in which the difference is larger than the threshold value is present, a region including the detector element may be dynamically set, and it may be determined whether a percentage of detector elements in which the difference is larger than the threshold value is high within the set region. In addition, when a percentage of detector elements in which the difference is larger than the threshold value is low in a certain region, whether the update of FPN data is performed is arbitrary with respect to the detector elements, included in the region, in which the difference is larger than the threshold value. With respect to such detector elements, the update of FPN data may not performed, and the FPN data may be updated by the calculated amount of the FPN component.

Subsequently, a third embodiment of the present invention will be described. FIG. 10 shows an infrared imaging device according to the third embodiment of the present invention. An infrared imaging device 100b according to the present embodiment includes a focus adjustment mechanism 16 and a position sensor 17, in addition to the configuration of the infrared imaging device 100 according to the first embodiment shown in FIG. 1. The other points may be the same as those in the first embodiment or the second embodiment.

In the present embodiment, the optical system 10 can control the position (imaging position) of an imaging surface. The focus adjustment mechanism 16 adjusts a relative positional relationship between the optical system 10 and the infrared detector 11. Hereinafter, a description will be given in which the relative positional relationship between the optical system 10 and the infrared detector 11 is adjusted by changing the position of the optical system 10. The focus adjustment mechanism 16 includes, for example, a motor that changes the position of a lens included in the optical system 10 and a drive circuit that drives the motor. The position sensor 17 detects the position of the lens included in the optical system 10. The position of the lens included in the optical system 10 is changed, and thus the imaging position of the optical system 10 is changed.

The control unit 19 also serves as a focus control unit that controls the imaging position of the optical system 10. The control unit 19 transmits a position signal for controlling the position of the optical system 10 to the focus adjustment mechanism 16. The focus adjustment mechanism 16 moves the optical system 10 to a position indicated by the received position signal. During the normal imaging mode, the control unit 19 controls the position of the optical system 10 to a position at which the imaging surface of the optical system 10 is coincident with the detection surface of the infrared detector 11, through the focus adjustment mechanism 16. During the normal imaging mode, the position of the optical system 10 may be changed following the motion of a subject, and may be fixed at a certain position.

During the update mode of FPN data, the control unit 19 controls the position of the optical system 10 to a position at which the imaging surface of the optical system 10 is not coincident with the detection surface of the infrared detector 11, through the focus adjustment mechanism 16. The control unit 19 controls the position of the optical system 10, for example, to a position at which the optical system 10 enters a focused state when a subject is closest to the optical system 10, or a position at which the optical system 10 enters a focused state when a subject is present in infinity.

Here, a state where the imaging surface of the optical system 10 is not coincident with the detection surface of the infrared detector 11 is called a non-focused state. That is, a state where an image based on the optical system 10 is not formed in the detector element of the infrared detector 11 is called a non-focused state. A state where images are not formed in the regions of all the detector elements is not necessarily required, and even a state where images are formed in some regions is assumed to a non-focused state as a whole. In addition, a state where the imaging surface of the optical system 10 is coincident with the detection surface of the infrared detector 11 is called a focused state. That is, a state where an image based on the optical system 10 is formed in the detector element of the infrared detector 11 is called a focused state. The imaging surface of the optical system 10 and the detection surface of the infrared detector 11 are not required to be entirely coincident with each other, and include a state where a subject is resolved on the detection surface of the infrared detector 11 to a recognizable degree.

During the update mode of FPN data, the control unit 19 controls the position of the optical system 10 to a position at which the imaging surface of the optical system 10 is not coincident with the detection surface of the infrared detector 11, based on a position signal transmitted to the focus adjustment mechanism 16. The control unit 19 transmits a position signal indicating a position at which the optical system 10 is set to be in a focused state, for example, when a subject is closest to the optical system 10, to the focus adjustment mechanism 16. Alternatively, a position signal indicating a position at which the optical system 10 is set to be in a focused state when a subject is present in infinity is transmitted to the focus adjustment mechanism 16.

The control unit 19 may determine a position signal transmitted to the focus adjustment mechanism 16, in accordance with a positional relationship between the position of the optical system 10 detected by the position sensor 17 during switching to the update mode of FPN data, and the position at which the optical system 10 is set to be in a focused state when a subject is closest to the optical system 10 and the position at which the optical system 10 is set to be in a focused state when a subject is present in infinity. The control unit 19, for example, sets the position of the optical system 10 detected by the position sensor 17 to Px, sets the position of the optical system 10, set to be in a focused state in a case where a subject is closest to the optical system 10, to P1, and sets the position of the optical system 10, set to be in a focused state in a case where a subject is present in infinity, to P2, to thereby calculate |Px−P1| and |Px−P2|. In a case of |Px−P1|>|Px−P2|, the control unit 19 outputs a position signal indicating that the position of the optical system 10 is set to P1 to the focus adjustment mechanism 16. In a case of |Px−P1|<|Px−P2|, the control unit 19 outputs a position signal indicating that the position of the optical system 10 is set to P2 to the focus adjustment mechanism 16. In this manner, it is possible to further increase a shift between the imaging position of the optical system 10 and the position of the detection surface of the infrared detector 11, and to increase a blur of the infrared image.

In a case where the optical system 10 is set to be in a non-focused state, the image of a subject is formed at a position shifted from the detection surface of the infrared detector 11, and the subject is not resolved. For this reason, infrared rays incident on each detection element of the infrared detector 11 become substantially uniform at least locally, and an infrared image captured by the infrared detector 11 becomes a blurred image. During the update mode of FPN data, the infrared detection signal detected by the infrared detector 11 in a state where the optical system is controlled to be in a non-focused state is input to the noise data update processing unit 44 (see FIG. 2). The signal component amount calculation unit 52 (see FIG. 3 or the like) of the noise data update processing unit 44 calculates the amount of a signal component on the basis of multiple times of infrared detection signals detected by the detector element of the infrared detector 11 in a state where the optical system 10 is controlled to be in a non-focused state.

In the present embodiment, in the update mode of FPN data, the optical system 10 is controlled to be in a non-focused state. The optical system is controlled to be in a non-focused state, and thus infrared rays incident on each detection element of the infrared detector 11 can be made substantially uniformly at least locally. Therefore, it can be expected that, even when a subject moves a little, the amount of infrared rays incident on the detector element hardly change. The optical system 10 is set to be in a non-focused state, and thus even when a subject moves a little, an error of the amount of a signal component dependent on incident infrared rays calculated in the signal component amount calculation unit 52 can be further reduced than in a case where the optical system 10 is set to be in a focused state. An error of the calculated amount of the FPN component can be reduced to an extent that the error the calculated amount of a signal component can be reduced.

Hereinbefore, the present invention has been described on the basis of the preferred embodiments, but the infrared imaging device and the method of updating fixed pattern noise data according to the present invention are not limited only to the above embodiments, and configurations corrected and changed variously from the configurations of the above embodiments are also included in the scope of the present invention.

Explanation of References

What is claimed is:

1. An infrared imaging device comprising:
   an infrared detector including a plurality of detector elements that detect incident infrared rays;
   a noise correction processing unit that subtracts fixed pattern noise data from a detection signal of the infrared rays detected by the plurality of detector elements, to thereby remove fixed pattern noise from the infrared detection signal; and
   a noise data update processing unit including a signal component amount calculation unit that calculates an amount of a signal component dependent on the infrared rays incident on the infrared detector included in the infrared detection signal, on the basis of a plurality of infrared detection signals obtained by detecting multiple times of infrared rays by the infrared detector, a fixed pattern noise calculation unit that calculates an amount of a fixed pattern noise component on the basis of the infrared detection signal and the calculated amount of a signal component, and a data update unit that updates the fixed pattern noise data with the calculated amount of a fixed pattern noise component, wherein the signal component amount calculation unit calculates dispersion or standard deviation of the plurality of the infrared detection signals detected by each detector element to be processed, and calculates the amount of a signal component on the basis of the calculated dispersion or standard deviation.

2. The infrared imaging device according to claim 1, wherein the fixed pattern noise calculation unit calculates a difference between the infrared detection signal and the calculated amount of a signal component as the amount of a fixed pattern noise component.

3. The infrared imaging device according to claim 1, wherein the noise data update processing unit further includes a determination unit that calculates a difference between the calculated amount of a fixed pattern noise component and the fixed pattern noise data before update with respect to each detector element, and determines whether the difference is equal to or less than a first threshold value, and
   the data update unit updates the fixed pattern noise data with the calculated amount of a fixed pattern noise component, with respect to a detector element in which the difference is determined to be equal to or less than the first threshold value.

4. The infrared imaging device according to claim 3, wherein the data update unit does not update the fixed pattern noise data with respect to a detector element in which the difference is determined to be larger than the first threshold value.

5. The infrared imaging device according to claim 3, wherein in a case where a percentage of the number of detector elements in which the difference in a certain region exceeds the first threshold value is higher than a second threshold value, the data update unit does not update the fixed pattern noise data with respect to detector elements included in the region.

6. The infrared imaging device according to claim 1, further comprising a temperature measurement unit that measures a temperature,
   wherein the data update unit updates the fixed pattern noise data in a case where a difference between a temperature measured by the temperature measurement unit and a temperature during previous update of the fixed pattern noise data is equal to or larger than a temperature threshold value.

7. The infrared imaging device according to claim 1, wherein the data update unit updates the fixed pattern noise data repeatedly.

8. The infrared imaging device according to claim 1, further comprising:
   an optical system which is capable of controlling an imaging position; and
   a focus position control unit that controls the imaging position of the optical system,
   wherein infrared rays are incident on the plurality of detector elements of the infrared detector through the optical system, and
   the signal component amount calculation unit calculates dispersion or standard deviation of the plurality of infrared detection signals detected by the detector elements in a state where the focus position control unit controls the imaging position of the optical system and the optical system is controlled to be in a non-focused state.

9. A method of updating fixed pattern noise data indicating fixed pattern noise in an infrared detector including a plurality of detector elements, the method comprising:

a step of detecting infrared rays using the infrared detector;

a step of calculating dispersion or standard deviation of multiple times of infrared detection signals obtained by performing the step of detecting infrared rays multiple times;

a step of calculating an amount of a signal component dependent on infrared rays incident on the detector elements included in the infrared detection signals, on the basis of the calculated dispersion or standard deviation;

a step of calculating an amount of a fixed pattern noise component on the basis of the infrared detection signals and the calculated amount of a signal component; and a step of updating the fixed pattern noise data with the calculated amount of a fixed pattern noise component.

10. The method of updating fixed pattern noise data according to claim 9, further comprising a step of calculating a difference between the calculated amount of a fixed pattern noise component and the fixed pattern noise data before update, in advance of the step of updating fixed pattern noise data, wherein the step of updating fixed pattern noise data includes updating the fixed pattern noise data with the calculated amount of a fixed pattern noise component, with respect to a detector element in which the difference between the calculated amount of a fixed pattern noise component and the fixed pattern noise data before update is equal to or less than a threshold value.

* * * * *